United States Patent
Su et al.

(10) Patent No.: US 9,979,509 B2
(45) Date of Patent: May 22, 2018

(54) APPARATUS, SYSTEM, AND METHOD FOR BLIND DECODING PCFICH FOR WIRELESS COMMUNICATION DEVICES

(71) Applicant: Apple Inc., Cupertino, CA (US)

(72) Inventors: Li Su, San Jose, CA (US); Jianxiong Shi, Dublin, CA (US); Sami M. Almalfouh, San Jose, CA (US)

(73) Assignee: Apple Inc., Cupertino, CA (US)

( * ) Notice: Subject to any disclaimer, the term of this patent is extended or adjusted under 35 U.S.C. 154(b) by 116 days.

(21) Appl. No.: 15/191,574

(22) Filed: Jun. 24, 2016

(65) Prior Publication Data
US 2017/0026941 A1    Jan. 26, 2017

Related U.S. Application Data

(60) Provisional application No. 62/196,559, filed on Jul. 24, 2015.

(51) Int. Cl.
*H04W 4/00* (2009.01)
*H04L 1/00* (2006.01)
*H04L 5/00* (2006.01)

(52) U.S. Cl.
CPC .......... *H04L 1/0038* (2013.01); *H04L 1/0046* (2013.01); *H04L 1/0072* (2013.01); *H04L 5/00* (2013.01)

(58) Field of Classification Search
CPC ....... H04L 1/0038; H04L 5/00; H04L 1/0046; H04L 1/0072
See application file for complete search history.

(56) References Cited

U.S. PATENT DOCUMENTS

| | | | |
|---|---|---|---|
| 8,917,697 B2 | 12/2014 | Miki et al. | |
| 2012/0039179 A1* | 2/2012 | Seo | H04L 5/001 370/241 |
| 2015/0003364 A1 | 1/2015 | Kim et al. | |
| 2015/0365930 A1* | 12/2015 | Tabet | H04B 17/336 370/329 |
| 2016/0182209 A1 | 6/2016 | Li et al. | |

* cited by examiner

*Primary Examiner* — Afshawn Towfighi
(74) *Attorney, Agent, or Firm* — Meyertons Hood Kivlin Kowert & Goetzel, P.C.; Jeffrey C. Hood

(57) ABSTRACT

A wireless communication device (UE) may reliably decode control information during wireless cellular communications. The UE may decode the Physical Control Format Indicator Channel (PCFICH) for a given wireless network, and if the decode is unsuccessful, the UE may perform a blind decode of the PCFICH. The UE may decode, for the network, a Physical Downlink Control Channel (PDCCH) for a current subframe using a specified control format indicator (CFI) value. If the decode of the PDCCH is successful, the UE may communicate over the NW, using the specified CFI value. If the decode for the current subframe is unsuccessful, the UE may decode the PDCCH for a different next subframe using a different CFI value until the PDCCH for the NW has been successfully decoded. The CFI value may be specified based at least on common signaling present in certain subframes received by the UE.

20 Claims, 5 Drawing Sheets

PCFICH Specs in 3GPP

Table 5.3.4-1: CFI Codewords

| CFI | CFI Codeword $<b_0, b_1, ..., b_{31}>$ |
|---|---|
| 1 | <0,1,1,0,1,1,0,1,1,0,1,1,0,1,1,0,1,1,0,1,1,0,1,1,0,1,1,0,1,1,0,1> |
| 2 | <1,0,1,1,0,1,1,0,1,1,0,1,1,0,1,1,0,1,1,0,1,1,0,1,1,0,1,1,0,1,1,0> |
| 3 | <1,1,0,1,1,0,1,1,0,1,1,0,1,1,0,1,1,0,1,1,0,1,1,0,1,1,0,1,1,0,1,1> |
| 4 (Reserved) | <0,0,0,0,0,0,0,0,0,0,0,0,0,0,0,0,0,0,0,0,0,0,0,0,0,0,0,0,0,0,0,0,> |

FIG. 5
(Prior Art)

APPARATUS, SYSTEM, AND METHOD FOR BLIND DECODING PCFICH FOR WIRELESS COMMUNICATION DEVICES

PRIORITY CLAIM

This application claims benefit of priority of U.S. Provisional Patent Application Ser. No. 62/196,559 titled "Apparatus, System, and Method for Blind Decoding PCFICH for Wireless Communication Devices", filed on Jul. 24, 2015, which is hereby incorporated by reference as though fully and completely set forth herein.

FIELD OF THE INVENTION

The present application relates to wireless communication devices, and more particularly to apparatuses, systems, and methods for providing improved decoding of PCFICH in LTE for wireless communications devices.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities.

In wireless data communications, automatic repeat request (ARQ; also referred to as automatic repeat query), is used as an error-control method for data transmission that uses acknowledgements (messages sent by the receiver indicating that it has correctly received a data frame or packet) and timeouts (specified time periods allowed to elapse before an acknowledgment is received) to achieve reliable data transmissions. If the sender does not receive an acknowledgment before the timeout, it usually re-transmits the frame/packet until the acknowledgment is received, or the number of re-transmissions has exceeded a predefined limit.

Hybrid automatic repeat request (HARQ) is a combination of high-rate forward error-correcting coding and ARQ error-control. In standard ARQ, redundant bits are added to the data to be transmitted using an error-detecting code such as a cyclic redundancy check (CRC), with receivers detecting a corrupted message requesting a new message from the sender. In Hybrid ARQ, the original data is encoded with a FEC (forward error correction or forward error coding) code, and the parity bits are either immediately transmitted along with the message, or they are transmitted only upon request by a receiver that has detected an erroneous message. The FEC code is typically used to correct an expected subset of all errors that may occur, while the ARQ provides a fallback to correct errors that cannot be corrected through the use of only the redundancy included in the initial transmission. Therefore, hybrid ARQ offers better performance in poor signal conditions, but at the expense of significantly lower throughput during good signal conditions. A signal quality crossover point may be defined, below which simple HARQ may be preferred, and above which basic ARQ may be used.

Long Term Evolution (LTE) has become the technology of choice for the majority of wireless network operators worldwide, providing mobile broadband data and high-speed Internet access to their subscriber base. LTE defines a number of downlink (DL) physical channels, categorized as transport or control channels, to carry information blocks received from the MAC and higher layers. LTE also defines three physical layer channels for the uplink (UL).

The Physical Downlink Shared Channel (PDSCH) is a DL transport channel, and is the main data-bearing channel allocated to users on a dynamic and opportunistic basis. The PDSCH carries data in Transport Blocks (TB) corresponding to a media access control protocol data unit (MAC PDU), passed from the MAC layer to the physical (PHY) layer once per Transmission Time Interval (TTI). The PDSCH is also used to transmit broadcast information such as System Information Blocks (SIB) and paging messages.

The Physical Downlink Control Channel (PDCCH) is a DL control channel that carries the resource assignment for UEs that are contained in a Downlink Control Information or Indicator (DCI) message. Multiple PDCCHs can be transmitted in the same subframe using Control Channel Elements (CCE), each of which is a nine set of four resource elements known as Resource Element Groups (REG). The PDCCH employs quadrature phase-shift keying (QPSK) modulation, with four QPSK symbols mapped to each REG. Furthermore, 1, 2, 4, or 8 CCEs can be used for a UE, depending on channel conditions, to ensure sufficient robustness.

The Physical Uplink Shared Channel (PUSCH) is a UL channel shared by all devices (user equipment, UE) in a radio cell to transmit user data to the network. The scheduling for all UEs is under control of the LTE base station (enhanced Node B, or eNB). The eNB uses the uplink scheduling grant (DCI format 0) to inform the UE about resource block (RB) assignment, and the modulation and coding scheme to be used. PUSCH typically supports QPSK and quadrature amplitude modulation (QAM). In addition to user data, the PUSCH also carries any control information necessary to decode the information, such as transport format indicators and multiple-in multiple-out (MIMO) parameters. Control data is multiplexed with information data prior to digital Fourier transform (DFT) spreading.

The Physical Hybrid ARQ Indicator Channel (PHICH) is a DL control channel that carries the HARQ acknowledge/negative-acknowledge (ACK/NACK), indicating to the UE whether the eNB correctly received uplink user data carried on the PUSCH. Information over the PHICH is typically BPSK (binary phase shift keying) modulated.

The Physical Control Format Indicator Channel (PCFICH) is a DL control channel that carries the Control format Indicator (CFI) which includes the number of orthogonal frequency-division multiplexing (OFDM) symbols used for control channel transmission in each subframe (typically 1, 2, or 3). The 32-bit long CFI is mapped to 16 Resource Elements in the first OFDM symbol of each downlink frame using QPSK modulation.

Therefore, as indicated above, during data communication over LTE, the DL uses the physical channel PDSCH, while in UL it uses the UL channel PUSCH. As also mentioned above, these two channels convey the transport blocks of data in addition to some MAC control and system information. To support the transmission of DL and UL transport channels, Downlink Shared Channel (DLSCH) and Uplink Shared Channel (UL-SCH) control signaling is required. This control information is sent in PDCCH and it contains DL resource assignment and UL grant information. PDCCH is sent in the beginning of every subframe in the first OFDM symbols. Depending on the level of robustness and the PDCCH system capacity (numbers of users to be simultaneously served in a TTI) the NW needs to achieve, PDCCH will be transmitted in either the first 1, 2, 3, or 4 OFDM symbols of a subframe. The number of OFDM symbols used in PDCCH is signaled in PCFICH.

Some types of LTE-capable devices may be range constrained, for example due to radio frequency (RF) sensitivity degradation, when contrasted with other LTE-capable wireless communication devices (e.g. cellular telephones). Such sensitivity degradation can mean a 10 dB-15 dB loss, for example, for decoding DL channels, such as PCFICH, PHICH, PDCCH, and PDSCH. Since the PHICH, PDCCH, and PDSCH may be power boosted for each UE, there may be no adverse effects on other UEs. However, the PCFICH cannot be power boosted since it is common for all UEs in detecting how many OFDM symbols are used for the PDCCH. It is therefore important to provide accurate and effective decoding of PCFICH for such UEs.

SUMMARY OF THE INVENTION

Embodiments described herein relate to a User Equipment (UE) device, base station, and/or relay station, and associated method for improved Physical Control Format Indicator Channel (PCFICH) decoding for power saving and range improvement during wireless communications, e.g. during Long Term Evolution (LTE) communications and transmissions.

As previously mentioned, in order to support the transmission of DL and UL transport channels, DLSCH and ULSCH control signaling is performed. The control information sent over the PDCCH contains DL resource assignment and UL grant information. PDCCH information may be sent in the beginning of every subframe in the first OFDM symbols. The PDCCH information may be transmitted in either the first 1, 2, 3, or 4 OFDM symbols of a subframe, with the number of OFDM symbols used in the PDCCH signaled in the PCFICH. In one set of embodiments, a UE may attempt to decode the PCFICH in order to obtain the number of OFDM symbols used for the PDCCH, and if the decoding is unsuccessful, the UE may perform a "blind" decode by decoding the PDCCH per one or more consecutive subframes using specified (assumed) respective CFI values for each subframe as necessary.

Because the PCFICH is fixed for each cell, i.e. for each network (NW), once the UE has decoded the master information block (MIB) for a new cell, and proceeded to select/reselect to this new cell, it may "blind" decode this cell's PCFICH once per one subframe as follows. The UE may assign a specific value to the CFI at a first subframe, e.g. assign CFI value=1 at subframe N, then decode this subframe's PDCCH with the specified CFI value. If the decode fails, the UE may assign a different value to the CFI for a next subframe, e.g. assign CFI value=2 at subframe N+1, then decode this subframe's PDCCH with the specified different CFI value. This may be performed until decode of the PDCCH for the given subframe is successful, and the value of CFI used for successful decoding of the given subframe may subsequently be used throughout transmission conducted within the given cell. Accordingly, in a worst case scenario it may take four (4) subframes to successfully decode a PDCCH.

It should be noted here that failure of the UE to decode a PDCCH (using the assigned CFI value) may mean one or more of the following: (i) there was a PDCCH for the UE but the UE failed to decode it, e.g. because of channel conditions or an incorrect choice for the value of CFI, or (ii) there was no PDCCH for the UE and hence the PDCCH decode did not succeed. There are however, specific subframes in which common signaling is sent to all UEs (e.g., subframes carrying SIB or Paging, etc.) Some or all of the common signaling may be used to determine the value of CFI, or a most probable value of CFI. Alternatively, for such subframes, the UE may be able to save the samples from the subframe and attempt to "blind" decode PCFICH offline, for all possible combinations, to be used for the next paging/SIB occasion, or data.

At most three additional (or extra) subframes may be necessary to determine the CFI value corresponding to a given cell or network. While the CFI value is not fixed—e.g. it may actually be different in each subframe for a given cell—it usually does not change that frequently. On the other hand, the PCFICH location in the first OFDM symbol is fixed for a given Cell ID and bandwidth. In addition, because a CFI value of 4 is typically used for cells having a bandwidth of ~1.4 Mhz, when performing the "blind" decode process described above, the specified order in which different CFI values are assigned for each subsequent subframe (if and as necessary) may deviate from a simple numerically ascending order. For example, in some embodiments, the CFI value for the first subframe may be assigned to be 2 as opposed to 1. For example, CFI values may be assigned for subsequent subframes (if and as necessary) following the sequence: 2, 1, 3. In other embodiments, different sequences may be used as desired and possibly dictated by or determined based on various conditions and/or additional knowledge and information about communications within a given cell.

Pursuant to the above, a wireless communications device (UE) may operate to establish communications within a wireless network (NW), and "blind" decode the PCFICH for the NW. The blind decode may include the UE decoding the PDCCH for a current subframe using a specified control format indicator (CFI) value. Responsive to results of the decoding the UE may communicate over the NW using the specified CFI value if the results indicate that the decoding was successful. If the results indicate that the decoding for the current subframe using the specified CFI value was unsuccessful, the UE may decode the PDCCH for a next subframe using a next CFI value different from the specified CFI value. The UE may decode the PDCCH for subsequent subframes different from all previous subframes and using a new CFI value different from all previously used CFI values, each time a most recent previous decoding of the PDCCH for the NW is unsuccessful. Once the PDCCH has been successfully decoded, the CFI value used during the decoding process may be used for subsequent communications of the UE over the NW.

In some embodiments, the UE may assign the specified CFI value and all different CFI values used during the blind decode process according to a previously specified list of CFI values. In one set of embodiments, the UE may first decode the PCFICH for the NW prior to performing the blind decode, and may subsequently perform the blind decode responsive to the decoding of the PCFICH being unsuccessful. In some embodiments, the NW may be a Long Term Evolution network.

In one set of embodiments, a PCFICH decode procedure for a wireless communication device may include soft-combining the PCFICH with one or more previous subframes' PCFICH(s) when applicable, prior to decoding the PCFICH for a given cell. That is, in case of an unsuccessful PCFICH decode and a subsequent unsuccessful blind decode of the PCFICH for the current subframe (i.e. a subsequent unsuccessful decode of the PDCCH using a specified value of CFI for the current subframe), the PCFICH of the next subframe may be soft-combined with the PCFICH of the current subframe (or with a current soft-combined PCFICH as the case may be) prior to decoding the PCFICH of the next subframe (and performing a subsequent blind decode of the PCFICH for the next subframe if necessary).

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

FIG. 5 shows a table with the PCFICH codewords in the current 3GPP specification, according to prior art.

Figure 1:
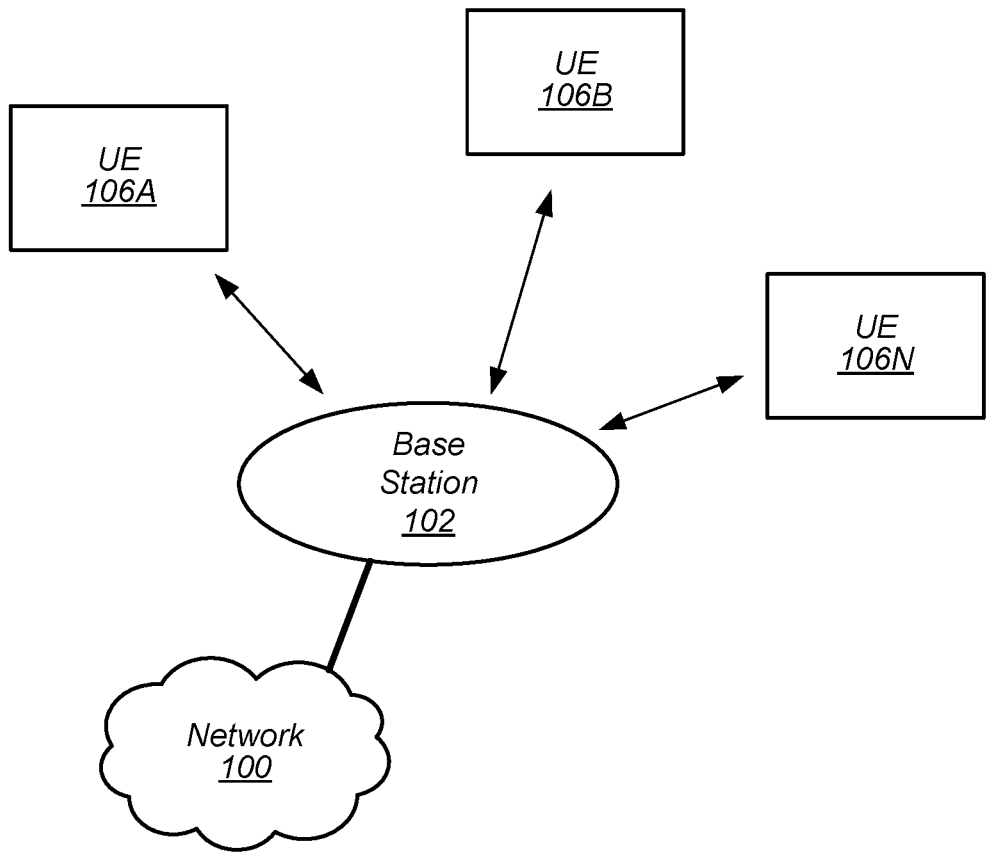
FIG. 1 illustrates an exemplary (and simplified) wireless communication system according to one set of embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

Various acronyms are used throughout the present application. Definitions of the most prominently used acronyms that may appear throughout the present application are provided below:
ACK: Acknowledge
ARQ: Automatic Repeat Request (also: Automatic Repeat Query)
BPSK: Binary Phase-Shift Keying
BS: Base Station
CCE: Control Channel Elements
CFI: Control format Indicator
CQI: Channel Quality Indicator
CRC: Cyclic Redundancy Check
DCI: Downlink Control Information
DL: Downlink (from BS to UE)
DLSCH: Downlink Shared Channel
FDD: Frequency Division Duplexing
FEC: Forward Error Correction
GPS: Global Positioning System
GSM: Global System for Mobile Communication
HARQ: Hybrid Automatic Repeat Request
LTE: Long Term Evolution
MAC: Media Access Control (layer)
MIMO: Multiple-In Multiple-Out
NACK: Negative Acknowledge
NW: Network
OFDM: Orthogonal Frequency-Division Multiplexing
PCFICH: Physical Control Format Indicator Channel
PDCCH: Physical Downlink Control Channel
PDSCH: Physical Downlink Shared Channel
PDU: Protocol Data Unit
PHICH: Physical HARQ Indicator Channel
PUSCH: Physical Uplink Shared Channel
PHY: Physical (Layer)
QPSK: Quadrature Phase-Shift Keying
REG: Resource Element Group
RNTI: Radio Network Temporary Identifiers
RRC: Radio Resource Control
RSRP: Reference Signal Received Power
RSSI: Reference Signal Strength Indicator
RX: Reception
SINR: Signal-To-Interference-Plus-Noise Ratio
TB: Transport Blocks
TDD: Time Division Duplexing
TTI: Transmission Time Interval
TX: Transmission
UE: User Equipment
UL: Uplink (from UE to BS)
ULSCH: Uplink Shared Channel
UMTS: Universal Mobile Telecommunication System Terms The following is a glossary of terms that may appear in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-transitory memory such as a Flash, magnetic media, e.g., a hard drive, or optical storage; registers, or other similar types of memory elements, etc. The memory medium may comprise other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, Play Station Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station (BS)—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, e.g. in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

DCI—refers to downlink control information. There are various DCI formats used in LTE in PDCCH (Physical Downlink Control Channel). The DCI format is a predefined format in which the downlink control information is packed/formed and transmitted in PDCCH.

Figure 2:
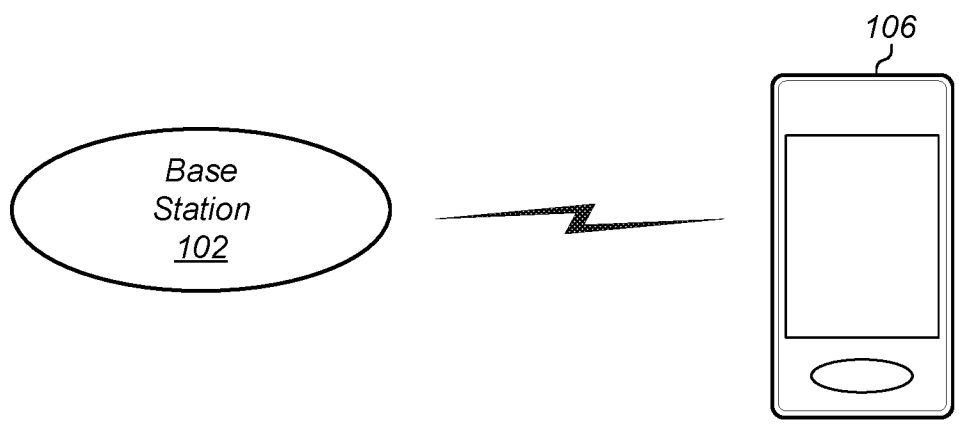
FIG. 2 illustrates a base station in communication with a wireless user equipment (UE) device according to one set of embodiments.

FIGS. 1 and 2—Communication System

FIG. 1 illustrates an exemplary (and simplified) wireless communication system. It is noted that the system of FIG. 1 is merely one example of a possible system, and embodiments may be implemented in any of various systems, as desired. As shown, the exemplary wireless communication system includes a base station 102 which communicates over a transmission medium with one or more user devices 106A through 106N. Each of the user devices may be referred to herein as a "user equipment" (UE) or UE device. Thus, the user devices 106A-106N are referred to as UEs or UE devices. Furthermore, when referring to an individual UE in general, user devices are also referenced herein as UE 106 or simply UE.

The base station 102 may be a base transceiver station (BTS) or cell site, and may include hardware that enables wireless communication with the UEs 106A through 106N. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), 3GPP2 CDMA2000 (e.g., 1xRTT, 1xEV-DO, HRPD, eHRPD), Wi-Fi, WiMAX etc. In some embodiments, the base station 102 communicates with at least one UE using improved PCFICH decoding techniques as disclosed herein.

UE 106 may be capable of communicating using multiple wireless communication standards. For example, a UE 106 might be configured to communicate using either or both of a 3GPP cellular communication standard (such as LTE) or a 3GPP2 cellular communication standard (such as a cellular communication standard in the CDMA2000 family of cellular communication standards). In some embodiments, the UE 106 may be configured to communicate with base station 102 according to improved PCFICH decoding methods as described herein. Base station 102 and other similar base stations operating according to the same or a different cellular communication standard may thus be provided as one or more networks of cells, which may provide continuous or nearly continuous overlapping service to UE 106 and similar devices over a wide geographic area via one or more cellular communication standards.

The UE 106 might also or alternatively be configured to communicate using WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates an exemplary system in which user equipment 106 (e.g., one of the devices 106A through 106N) is in communication with the base station 102. The UE 106 may be a device with wireless network connectivity such as a mobile phone, a hand-held device, a wearable device, a computer or a tablet, or virtually any type of wireless device. The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments of improved decoding of PCFICH described herein, or any portion of any of the method embodiments of improved decoding of PCFICH described herein. The UE 106 may be configured to communicate using any of multiple wireless communication protocols. For example, the UE 106 may be configured to communicate using two or more of CDMA2000, LTE, LTE-A, WLAN, or GNSS. Other combinations of wireless communication standards are also possible.

The UE 106 may include one or more antennas for communicating using one or more wireless communication protocols. In some embodiments, the UE 106 may share one or more parts of a receive chain and/or transmit chain between multiple wireless communication standards. The shared radio may include a single antenna, or may include multiple antennas (e.g., for MIMO) for performing wireless communications. Alternatively, the UE 106 may include separate transmit and/or receive chains (e.g., including separate antennas and other radio components) for each wireless communication protocol with which it is configured to communicate. As another alternative, the UE 106 may include one or more radios which are shared between multiple wireless communication protocols, and one or more radios which are used exclusively by a single wireless communication protocol. For example, the UE 106 may include a shared radio for communicating using either of LTE or CDMA2000 1xRTT, and separate radios for communicating using each of Wi-Fi and BLUETOOTH™. Other configurations are also possible.

Figure 3:
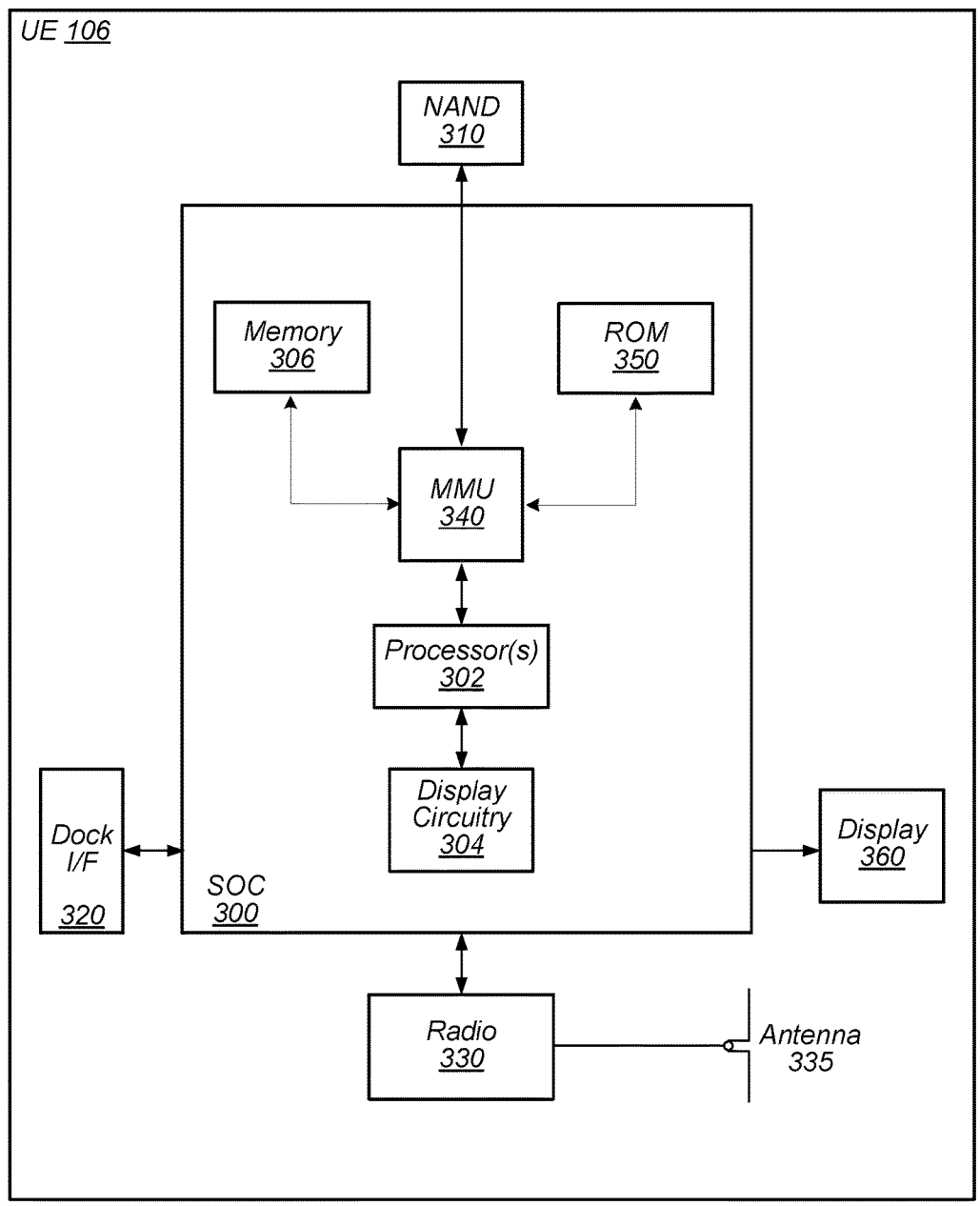
FIG. 3 illustrates an exemplary block diagram of a UE, according to one set of embodiments.

FIG. 3—Exemplary Block Diagram of a UE

FIG. 3 illustrates an exemplary block diagram of a UE 106. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to the computer system), the display 360, and wireless communication circuitry (e.g., for LTE, LTE-A, CDMA2000, BLUETOOTH™, Wi-Fi, GPS, etc.). The UE device 106 may include at least one antenna 335, and possibly multiple antennas 335, for performing wireless communication with base stations and/or other devices. For example, the UE device 106 may use antenna(s) 335 to perform the wireless communication. As noted above, the UE may be configured to communicate wirelessly using multiple wireless communication standards in some embodiments.

As described further subsequently herein, the UE 106 (and base station 102) may include hardware and software components for implementing a method for improved decoding of PCFICH. The processor(s) 302 of the UE device 106 may be configured to implement part or all of the methods of improved decoding of PCFICH described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components, such as Radio 330, as shown in FIG. 3, to implement improved decoding of PCFICH according to various embodiments disclosed herein.

Figure 4:
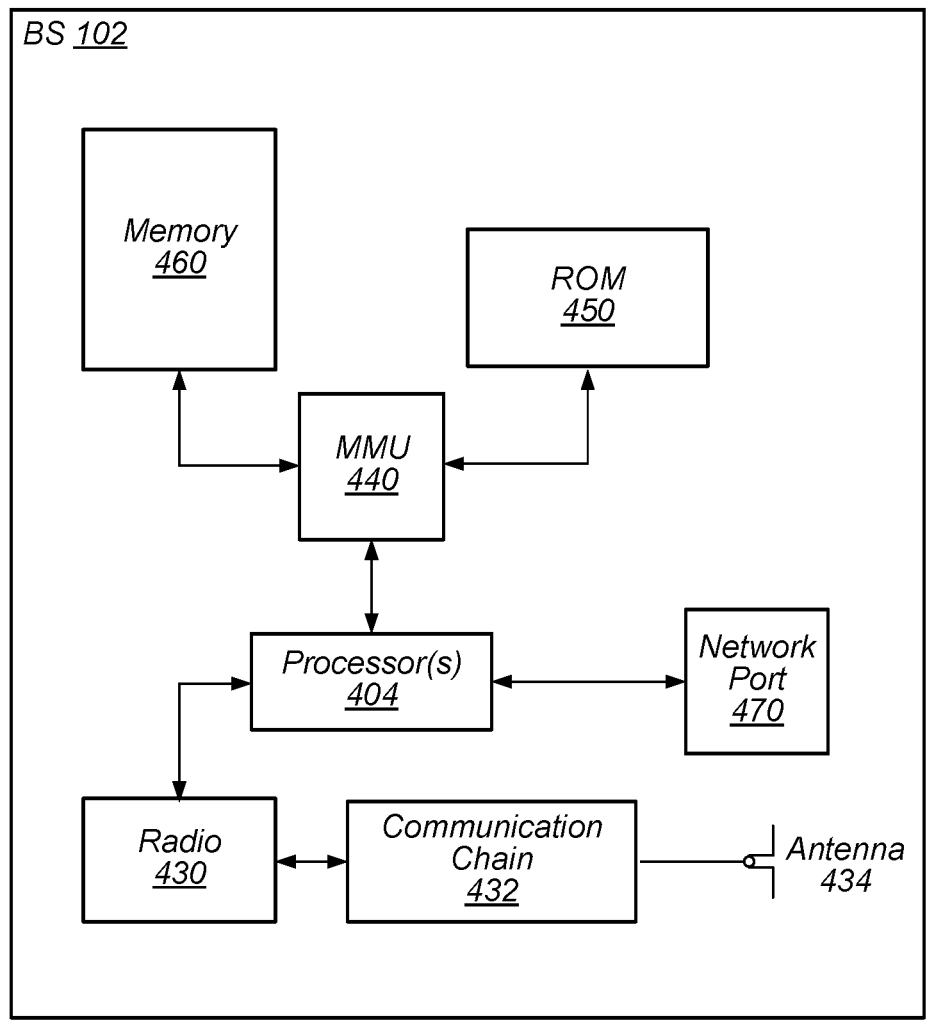
FIG. 4 illustrates an exemplary block diagram of a base station according to one set of embodiments.

FIG. 4—Exemplary Block Diagram of a Base Station

FIG. 4 illustrates an exemplary block diagram of a base station 102. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider). The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas 434. The antenna(s) 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless telecommunication standards, including, but not limited to, LTE, LTE-A WCDMA, CDMA2000, etc.

The processor(s) 404 of the base station 102 may be configured to implement part or all of the methods described herein for improved decoding of PCFICH, e.g., by executing program instructions stored on a memory medium (e.g., a non-transitory computer-readable memory medium). Alternatively, the processor(s) 404 may be configured as a programmable hardware element, such as an FPGA (Field Programmable Gate Array), or as an ASIC (Application Specific Integrated Circuit), or a combination thereof. Overall, the various components (460, 450, 440, 404, 430, 432, 470 and 434) of B S 102 may interoperate to implement at least part or all of the methods described herein for improved decoding of PCFICH.

Improved Decoding of PCFICH

As previously mentioned, it is desirable to alleviate the effects of poor reception of PCFICH, for example when the device is range constrained (e.g. link budget limited) or situated in a poor coverage area, in order to provide an improved decoding of PCFICH. Therefore, various embodiments described herein relate to a UE, base station, and/or relay station, and associated method for improved decoding of PCFICH in LTE (long term evolution) for power saving and range improvement during wireless communications, e.g. during LTE communications and transmissions. More specifically, various embodiments described herein relate to decoding PCFICH for LTE-capable wireless communication devices that may experience range limiting RF issues, such as RF sensitivity degradation when contrasted with other wireless communication devices or other LTE-capable wireless communication devices.

FIG. 5 shows a table with the PCFICH codewords in the current 3GPP specification, according to prior art. As seen in FIG. 5, a PCFICH (or CFI) codeword contains 32 bits, and may be indicative of a CFI value of 1, 2, or 3 if the system bandwidth (BW) is more than 10 resource blocks (RBs), otherwise it is indicative of CFI+1 if the system BW is less than or equal to 10 RBs. The PCFICH may be allocated in one of a variety of different ways. For example, in some embodiments the allocation may be for 1.4 MHz, CFI=2 (CF2), with PDCCH on three (3) OFDM symbols. The UE may extract the resource element that contains the PCFICH, decode the PCFICH, and read the values.

As explained above, PCFICH does not support channel coding, and its performance might be degraded in case of range-constrained devices. It can therefore create a bottleneck when decoding any control or shared channel (PDCCH/PDSCH). As previously mentioned, PHICH, PDCCH, and PDSCH may be power boosted per device, which won't adversely affect other wireless devices. However, PCFICH may not be power boosted since it is common for all UEs, as it is used to detect how many OFDM symbols are used for PDCCH. As shown in FIG. 5, PCFICH decoding may yield one of four values, 1, 2, 3, or 4. Thus, if PCFICH decoding is unsuccessful, one possible solution may include trying all possible values (1, 2, 3, 4) when decoding PDCCH in a subframe. For example, the PDCCH may be decoded with the assumption that it occupies either 1, 2, 3 or 4 OFDM symbols. If the PDCCH decode for the selected CFI value fails, the PDCCH may be decoded again with a different CFI value, and this process may be performed with a different CFI value for one subframe until the PDCCH has been successfully decoded. However, this method may increase the software implementation complexity in the UE, and may also increase the UE computation load while extending the PDCCH to PDSCH processing timeline, which may make this approach largely unfeasible for existing modem HW implementations.

Since the PCFICH is fixed for each cell, once the UE has decoded the master information block for a new cell and intends to select or reselect to this new cell, the UE may attempt to "blind" decode the cell's PCFICH once per single subframe. That is, the UE may attempt to "blindly" decode the number of PDCCH OFDM symbols, e.g. it may attempt to blindly decode the CFI. Depending on the system BW, there may be three CFI candidates (see FIG. 5, CFI candidates 1, 2 or 3; CFI 4 is reserved), with the number of PDCCH OFDM symbols corresponding to the CFI value for certain BWs (e.g., for BWs spanning more than 10 RBs), or the number of PDCCH OFDM symbols corresponding to CFI+1 for certain other BWs (e.g., BWs spanning 10 or fewer RBs). For example, for a system BW of 50 RBs (e.g. 10 MHz), the UE may typically try to decode PDCCH according to the latter being encoded over one (1), two (2) or three (3) OFDM symbols. However, in order not to have to decode over the entire CFI range and not to increase the UE computation load and/or not to extend the PDCCH to PDSCH processing timeline, the UE may operate to perform "blind" decoding of PCFICH as follows.

The UE may assign a specific value to the CFI at a first subframe, e.g. assign a value of 1 to the CFI at subframe N, and decode the subframe's (subframe N's) PDCCH with the specified CFI value. If the decode fails, the UE may assign a different value to the CFI for a next subframe, e.g. assign a value of 2 to the CFI at subframe N+1, then decode this subframe's (subframe [N+1]'s) PDCCH with the specified different value of CFI. This decode procedure may be performed until decode of the PDCCH for the given subframe is successful. Upon achieving a successful decode, the value of CFI used for the successful decode of the given subframe may subsequently be used throughout wireless communications conducted within the given cell. Therefore, in a worst case scenario it may take four (4) subframes to successfully decode a PDCCH payload.

As previously noted, a failure of the UE to decode a PDCCH (using the assigned CFI value) may mean that there was a PDCCH for the UE but the UE failed to decode it, e.g. due to channel conditions or an incorrect choice for the value of CFI, or it may mean that there was no PDCCH for the UE and hence the decode of PDCCH was unsuccessful. There are specific subframes in which common signaling is transmitted to all UEs (e.g., subframes carrying SIB or Paging, etc.), and a choice for the value for CFI may be based on at least some of this common signaling. Alternatively, for such subframes, the UE may be able to save the samples from the subframe and attempt to "blind" decode PCFICH offline for all possible combinations (as detailed above), to be used for the next paging/SIB occasion, or data.

There may be at most three additional (or extra) subframes used to determine the CFI value corresponding to a given cell or network. As previously indicated, the CFI value is not fixed—e.g. it may actually be different in each subframe for a given cell—though usually it may not change that frequently. However, the PCFICH location in the first OFDM symbol is fixed for a given Cell ID and bandwidth. Furthermore, as also noted above, a specific CFI value may be used for cells having a bandwidth of interest. For example, for certain BWs (e.g. BWs spanning 10 or fewer RBs, for example, spanning 1.4 MHz) the size of the PDCCH region may be represented by CFI+1, e.g. 2, 3 or 4 OFDM symbols. Accordingly, for such BWs, the size of PDCCH is not represented by 1 OFDM symbol, but either 2, 3 or 4 OFMD symbols. For BWs spanning greater than 10 RBs, e.g. BWs exceeding 1.4 MHz, the PDCCH region/size may be represented by one or more OFDM symbols. Therefore, when performing the "blind" decode process, the specified order in which different CFI values are assigned for each subsequent subframe (if and as necessary) may deviate from a simple numerically ascending order. For example, in some embodiments, the CFI value for the first subframe may be assigned to be 2. In some embodiments, CFI values may be assigned for subsequent subframes (if and as necessary) following the sequence: 2, 1, 3. In other embodiments, different sequences may be used as desired and possibly dictated by or determined based on various conditions and/or additional knowledge and information about the wireless communications within a given cell (for example, based at least on information transmitted via common signaling in certain specific subframes, as indicated above).

Furthermore, in some embodiments, prior to each PCFICH decode attempt for a given cell, the PCFICH of a current subframe may be combined with the PCFICH of the previous subframe when applicable. That is, in the PCFICH decode of a current subframe is unsuccessful, and a subsequent blind decode of the PCFICH of the current subframe (i.e. a subsequent decode of the PDCCH using a specified value of CFI for the current subframe) are both unsuccessful, the PCFICH of the next subframe may be soft-combined with the PCFICH of the current subframe prior to decoding the PCFICH of the next subframe (and also prior to performing a subsequent blind decode of the PCFICH for the next subframe in case such blind decode is to be performed based on results of the preceding PCFICH decode).

One Example of a PCFICH Decode

The following provides one possible sequence that may occur when attempting to decode PCFICH for a given cell, according to some embodiments of a PCFICH decoding mechanism disclosed herein. Considering three subframes [N, N+1, N+2] and a previously specified CFI value sequence of [2, 3, 1], decoding of the PCFICH for a given cell may result in the following:

The UE may first decode the PCFICH of subframe N. If decoding of the PCFICH of subframe N fails, then the UE may proceed to blind decode the PCFICH of subframe N, that is, the UE may decode the PDCCH for subframe N using a previously specified PCFICH decode value (i.e. previously specified CFI value) of 2.

If the blind decode of the PCFICH of subframe N is successful, then the decode procedure is complete and the UE may use the CFI value of 2 for communications in the given cell. However, if decoding of the PDCCH for subframe N is unsuccessful, then the UE may soft-combine the PCFICH of subframe N+1 with the PCFICH of subframe N, then decode the soft-combined PCFICH. If the decode of the soft-combined PCFICH fails, then the UE may proceed to decode the PDCCH of subframe N+1 using the next CFI value in the previously specified list, i.e. using the previously specified CFI value of 3.

If the blind decode of the PCFICH of subframe N+1, i.e. the decoding of the PDCCH for subframe N+1 using a CFI value of 3, is successful, then the decode procedure is complete, and the UE may use the CFI value of 3 for communications in the given cell. If the PDCCH decode for subframe N+1 is unsuccessful, then UE may soft-combine the respective PCFICHs of subframe N, N+1 and N+2 (or, to put it another way, the UE may soft-combine the PCFICH of subframe N+2 with the previous soft-combined PCFICH) to obtain the (new) soft-combined PCFICH, then decode the soft-combined PCFICH. If the decode of the soft-combined PCFICH is unsuccessful, then the UE may the decode PDCCH of subframe N+2 using the next CFI value in the previously specified list, i.e. using the previously specified CFI value of 1.

If the PDCCH for subframe N+1 is successfully decoded, the UE may use the CFI value of 1 for communications over (or via, or in) the given cell.

It should be noted that as disclosed herein, soft-combining the respective PCFICHs of the various subframes refers to storing rather than discarding incorrectly received data blocks, and combining the stored incorrectly received data blocks with the received re-transmitted data blocks (i.e. when data is received a second time, the erroneously received previous data and the newly received data are combined) in an attempt to obtain correct data. As described above with respect to the PCFICH decode example, this may be cumulatively performed until the correct data is in fact received, i.e. until the (standard and/or blind) decoding of the PCFICH is successful. However, the combined payload may be discarded (reset) in some instances, for example after a certain number of unsuccessful PCFICH and/or PDCCH decoding attempts (e.g. after a certain number of PCFICH and/or PDCCH decode failures), as in such instances the payload may have changed, and soft-combining at that juncture may not be helpful and/or desired.

Exemplary Method for Decoding PCFICH

Figure 6:
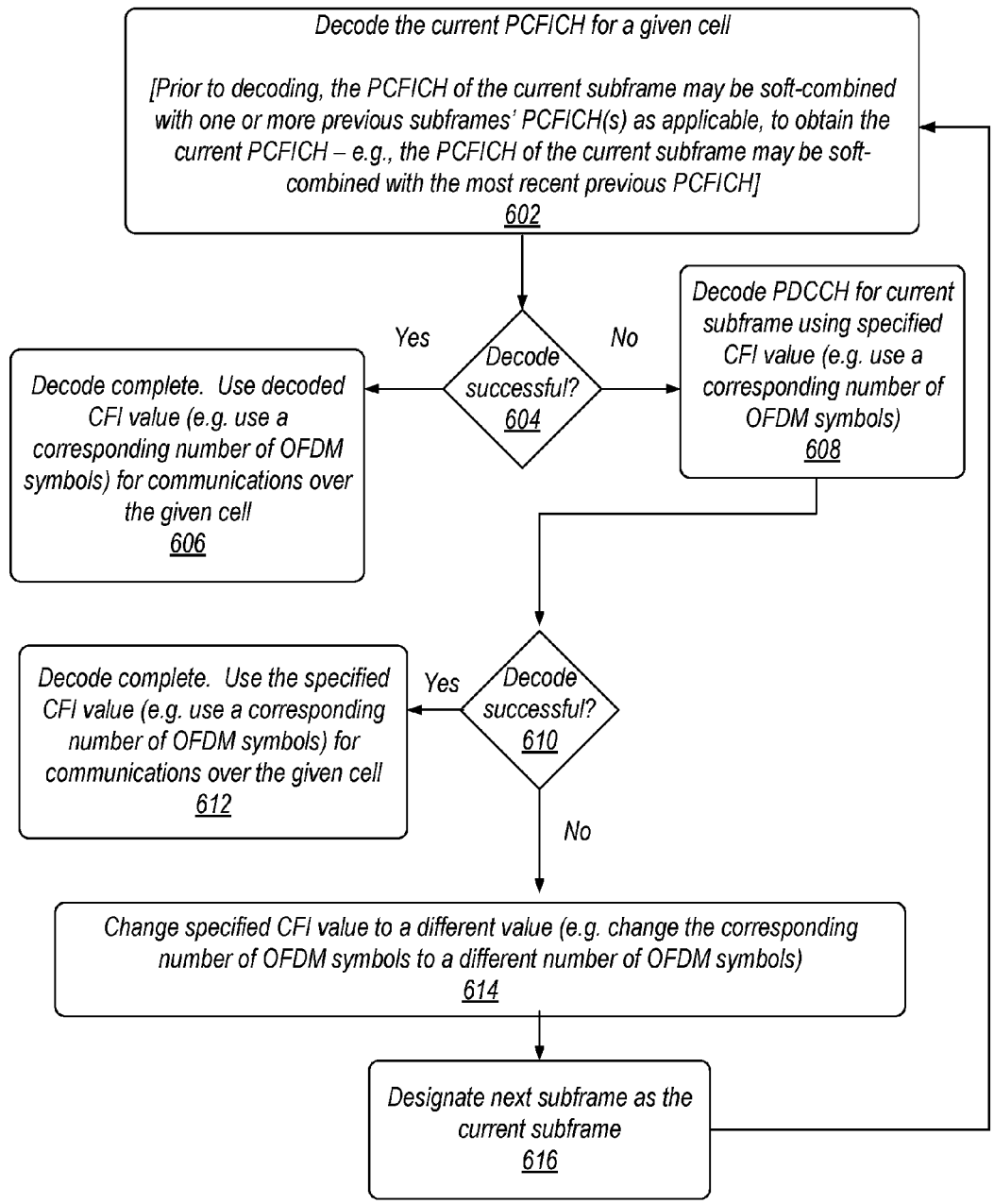
FIG. 6 shows a flowchart diagram of an exemplary method for decoding the PCFICH according to one set of embodiments.

FIG. 6 shows a flow diagram of an exemplary method for decoding the PCFICH for a given cell, for example an LTE cell, during wireless communications according to one set of embodiments. At 602 an attempt is made to decode the current PCFICH for a given cell. Prior to performing the PCFICH decode, the PCFICH of the current subframe (which, in some embodiments, may be considered the current PCFICH individually) may first be soft-combined with the respective PCFICH(s) of one or more previous subframes as applicable, to obtain the current PCFICH that will be decoded. To put it another way, the PCFICH of the current subframe may be soft-combined with the most recent previous PCFICH to obtain the current PCFICH. If the decode is successful ("Yes" branch taken at 604), the decoded CFI value (e.g. a corresponding number of OFDM symbols) may be used for wireless communications over the given cell (606). If the decode is unsuccessful ("No" branch taken at 604), then the PDCCH for a current subframe is decoded using a specified value of CFI, e.g. using a specified number of OFDM symbols (608). For example, a CFI value of 2 (e.g., a corresponding number of OFDM symbols) may be used by the UE to decode the PDCCH for an $N^{th}$ subframe.

If the PDCCH decode is successful, ("Yes" branch taken at 610), then the PDCCH decode is complete, and the specified CFI value that was used for decoding the PDCCH (e.g. the corresponding number of OFDM symbols that were used for decoding the PDCCH) may be used for all subsequent communications over the given cell (612). If on the other hand the decoding is unsuccessful ("No" branch taken at 610), the specified CFI value is changed to a different value, e.g., the corresponding number of OFDM symbols is changed to a different number of OFDM symbols (614), and a next subframe is designated as the current subframe (616). The UE may then proceed to again decode the current PCFICH, which may be obtained by soft-combing the PCFICH of the newly designated subframe with the most recent previous PCFICH (602). As previously mentioned, since the number of possible CFI values (e.g., the corresponding number of possible OFDM symbols) is limited, a successful decode may be expected within a deterministic time window. Accordingly, a successful decode may be achieved without an increase in the software implementation complexity in the UE and without increasing the UE computation load or extending the PDCCH to PDSCH processing timeline, making this solution very feasible for existing modem HW implementations.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. An apparatus comprising:
a processing element configured to cause a wireless communication device to:
(i) decode, for a wireless network (NW), a Physical Downlink Control Channel (PDCCH) for a current subframe using a specified control format indicator (CFI) value;
in response to results of the decode:
(ii) communicate over the NW using the specified CFI value if the results indicate that the decoding was successful; and
(iii) decode, for the NW, the PDCCH for a next subframe using a next CFI value different from the specified CFI value, if the results indicate that the decoding for the current subframe using the specified CFI value was unsuccessful.

2. The apparatus of claim 1, wherein the processing element is further configured to cause the wireless communication device to:
decode, for the NW, the PDCCH for a subsequent subframe different from all previous subframes and using a new CFI value different from all previously used CFI values, each time a most recent previous decoding of the PDCCH for the NW is unsuccessful.

3. The apparatus of claim 1, wherein the processing element is further configured to cause the wireless communication device to:
decode, for the NW, the PDCCH for a new subsequent subframe different from all previous subframes, using a new CFI value different from all previously used CFI values, until the PDCCH for the NW has been successfully decoded.

4. The apparatus of claim 1, wherein the processing element is further configured to cause the wireless communication device to assign the specified CFI value and the different CFI value according to a previously specified list of CFI values.

5. The apparatus of claim 1, wherein the processing element is further configured to cause the wireless communication device to:
decode, for the NW, a current Physical Control Format Indicator Channel (PCFICH) prior to performing (i).

6. The apparatus of claim 5, wherein the processing element is further configured to cause the wireless communication device to perform (i) in response to the decoding of the current PCFICH being unsuccessful.

7. The apparatus of claim 5, wherein the processing element is further configured to cause the wireless communication device to:
soft-combine a PCFICH of the current subframe with a most recent previous PCFICH to obtain the current PCFICH, prior to decoding the current PCFICH.

8. A wireless communication device comprising:
radio circuitry comprising one or more antennas and configured to facilitate wireless communication of the wireless communication device; and
a processing element configured to interoperate with the radio circuitry to cause the wireless communication device to:
(i) establish communications within a wireless network (NW);
(ii) decode, for the NW, a Physical Downlink Control Channel (PDCCH) for a current subframe using a specified control format indicator (CFI) value;
in response to results of the decoding:
(iii) communicate over the NW using the specified CFI value if the results indicate that the decoding was successful; and
(iii) decode, for the NW, the PDCCH for a next subframe using a next CFI value different from the specified CFI value, if the results indicate that the decoding for the current subframe using the specified CFI value was unsuccessful.

9. The wireless communication device of claim 8, wherein the processing element is configured to interoperate with the radio circuitry to further cause the wireless communication device to:
decode, for the NW, the PDCCH for a subsequent subframe different from all previous subframes and using a new CFI value different from all previously used CFI values, each time a most recent previous decoding of the PDCCH for the NW is unsuccessful.

10. The wireless communication device of claim 8, wherein the processing element is configured to interoperate with the radio circuitry to further cause the wireless communication device to:
decode, for the NW, the PDCCH for a new subsequent subframe different from all previous subframes and using a new CFI value different from all previously used CFI values, until the PDCCH for the NW has been successfully decoded.

11. The wireless communication device of claim 8, wherein the processing element is configured to interoperate with the radio circuitry to further cause the wireless communication device to assign the specified CFI value and the different CFI value according to a previously specified list of CFI values.

12. The wireless communication device of claim 8, wherein the processing element is configured to interoperate with the radio circuitry to further cause the wireless communication device to decode, for the NW, a current Physical Control Format Indicator Channel (PCFICH) prior to performing (ii).

13. The wireless communication device of claim 12, wherein the processing element is configured to interoperate with the radio circuitry to further cause the wireless communication device to perform (ii) in response to the decode of the current PCFICH being unsuccessful.

14. The wireless communication device of claim 12, wherein the processing element is configured to interoperate with the radio circuitry to further cause the wireless communication device to soft-combine a PCFICH of the current subframe with a most recent previous PCFICH to obtain the current PCFICH, prior to decoding the current PCFICH.

15. A non-transitory memory element storing programming instructions executable by a processing element to cause a wireless communications device to:
  (i) wirelessly communicate over a wireless network (NW);
  (ii) decode, for the NW, a Physical Downlink Control Channel (PDCCH) for a current subframe using a specified control format indicator (CFI) value;
  in response to results of the decoding:
    (iii) communicate over the NW using the specified CFI value if the results indicate that the decoding was successful; and
    (iii) decode, for the NW, the PDCCH for a next subframe using a next CFI value different from the specified CFI value if, the results indicate that the decoding for the current subframe using the specified CFI value was unsuccessful.

16. The non-transitory memory element of claim 15, wherein the instructions are further executable by the processing element to cause the wireless communications device to:
  decode, for the NW, the PDCCH for a subsequent subframe different from all previous subframes and using a new CFI value different from all previously used CFI values, each time a most recent previous decoding of the PDCCH for the NW is unsuccessful.

17. The non-transitory memory element of claim 15, wherein the instructions are further executable by the processing element to cause the wireless communications device to:
  decode, for the NW, the PDCCH for a new subsequent subframe different from all previous subframes and using a new CFI value different from all previously used CFI values, until the PDCCH for the NW has been successfully decoded.

18. The non-transitory memory element of claim 15, wherein the current subframe comprises common signaling intended for a plurality of wireless communication devices;
  wherein the instructions are further executable by the processing element to cause the wireless communications device to specify the next CFI value based at least in part on the common signaling.

19. The non-transitory memory element of claim 15, wherein the instructions are further executable by the processing element to cause the wireless communications device to decode, for the NW, a current Physical Control Format Indicator Channel (PCFICH) prior to performing (ii).

20. The non-transitory memory element of claim 19, the current subframe comprises common signaling intended for a plurality of wireless communication devices;
  wherein the instructions are further executable by the processing element to cause the wireless communications device to:
    save samples from the current subframe; and
    decode, offline, the PDCCH for all possible CFI values, according to at least the saved samples.

* * * * *